Nov. 21, 1961 H. W. JONES 3,009,591
TRANSPORTING AND DUMPING EQUIPMENT
Filed April 11, 1957 6 Sheets-Sheet 5
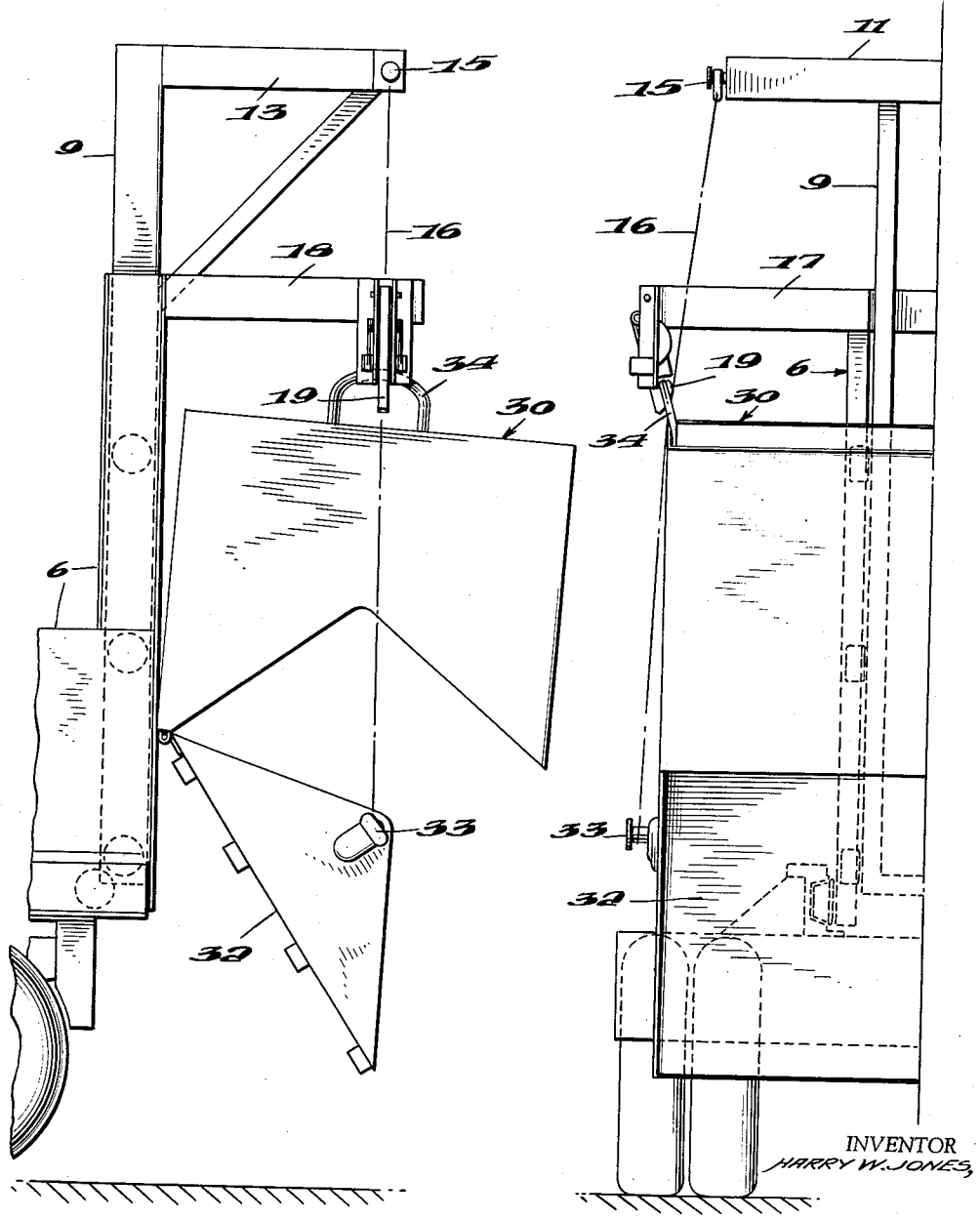
INVENTOR
HARRY W. JONES,
BY
ATTORNEYS Nov. 21, 1961 H. W. JONES 3,009,591
TRANSPORTING AND DUMPING EQUIPMENT
Filed April 11, 1957 6 Sheets-Sheet 6
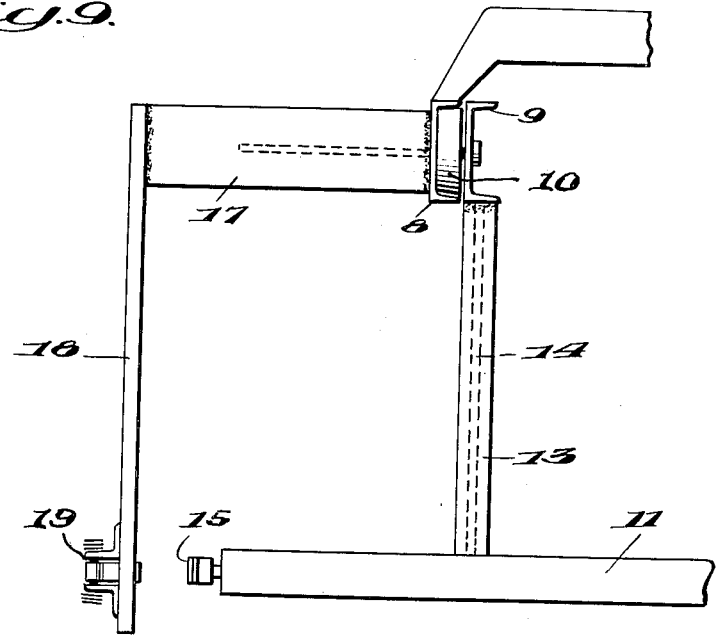
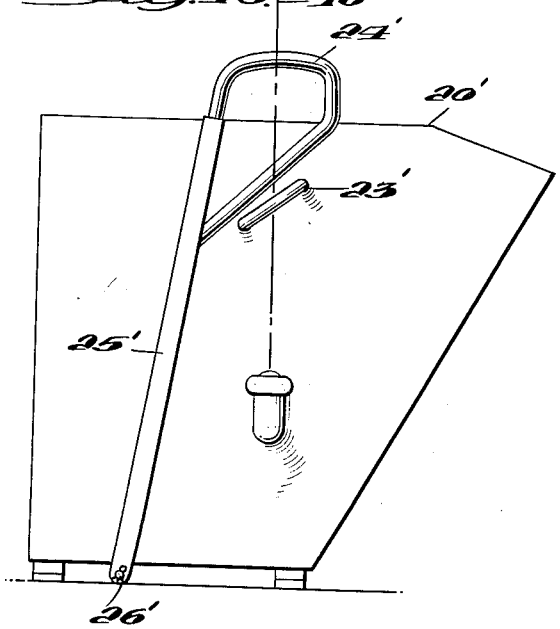
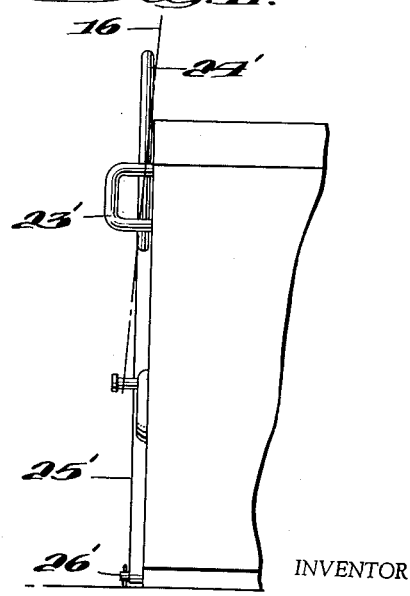
INVENTOR
HARRY W. JONES,
BY
ATTORNEYS

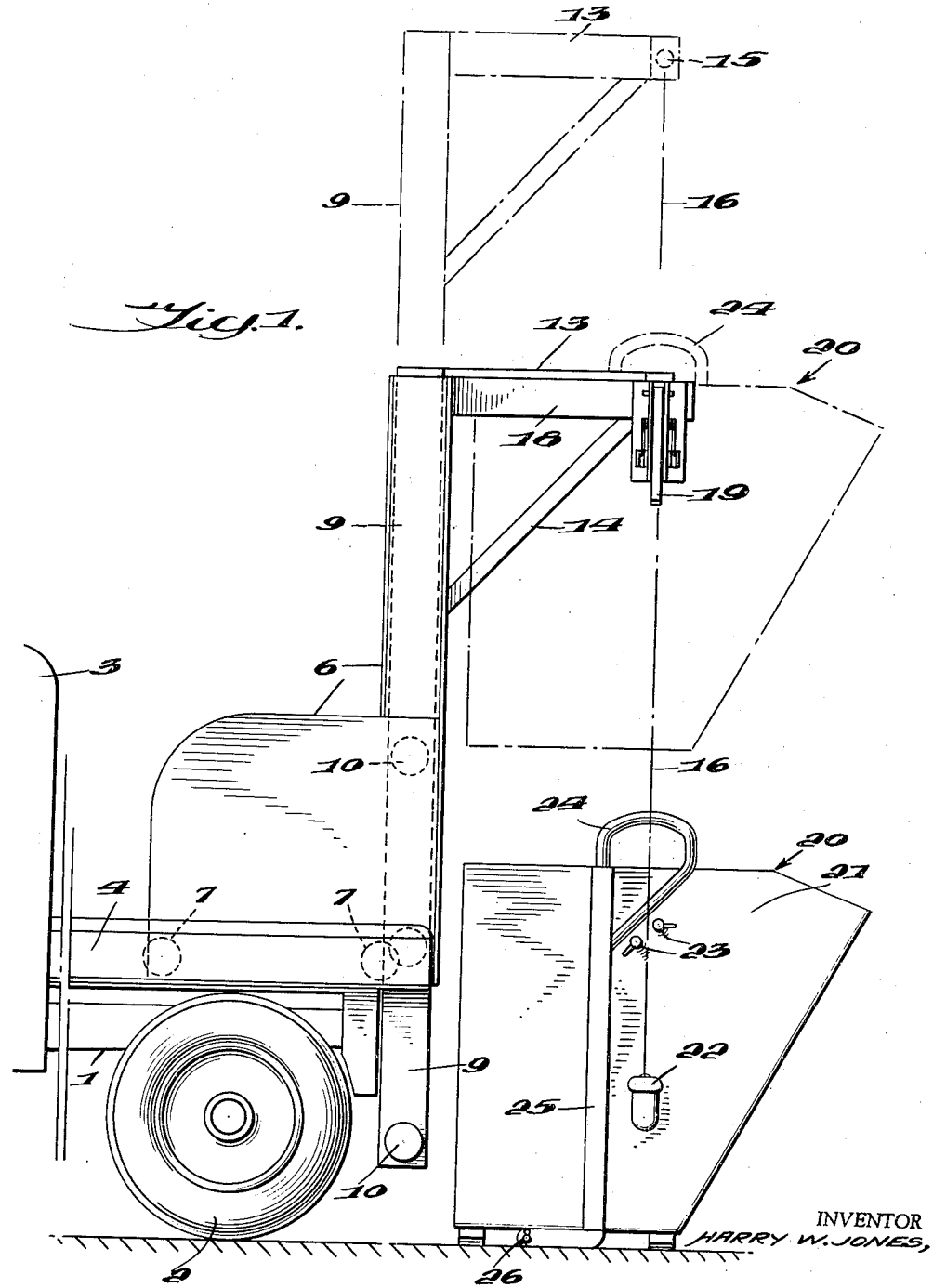

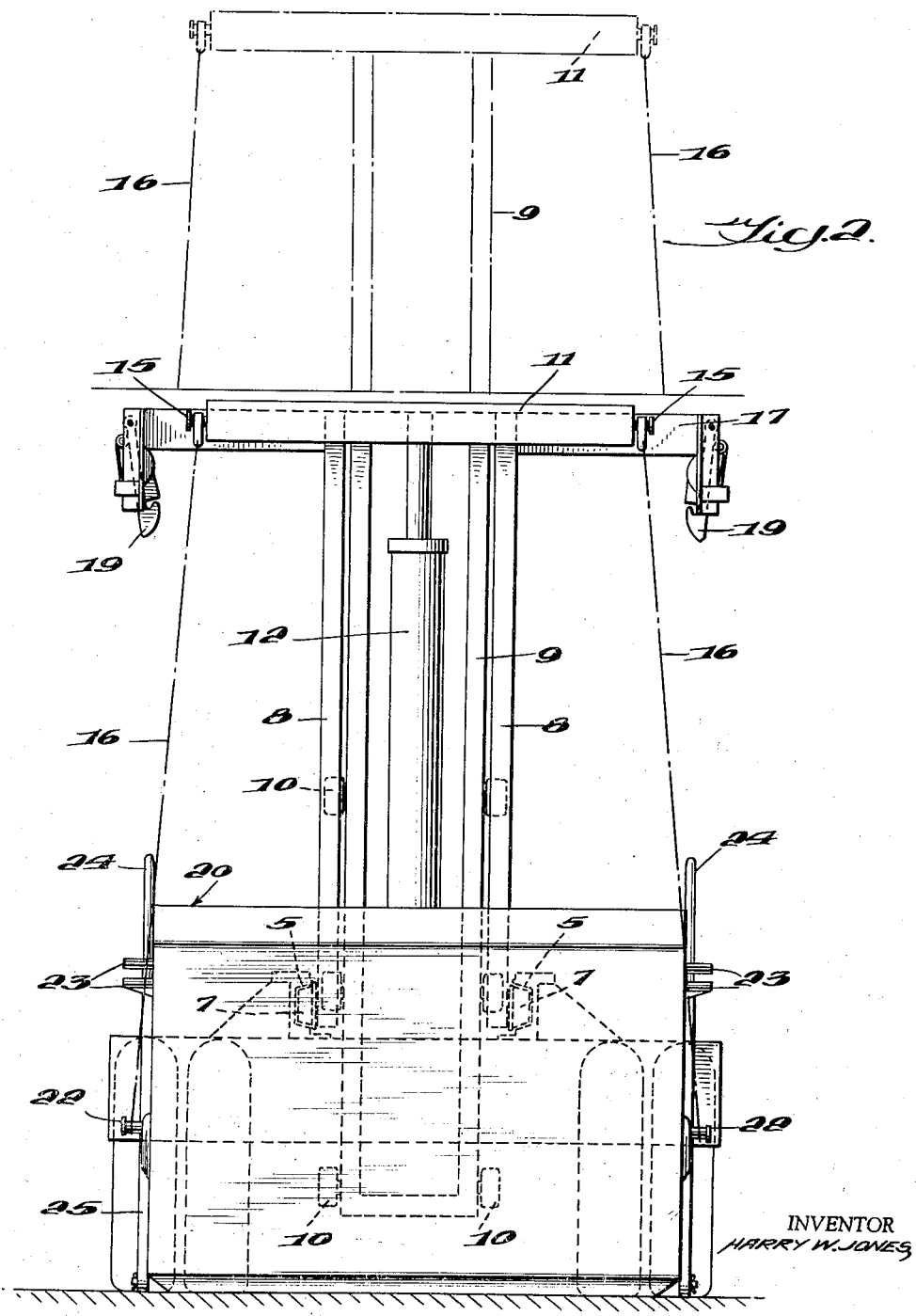

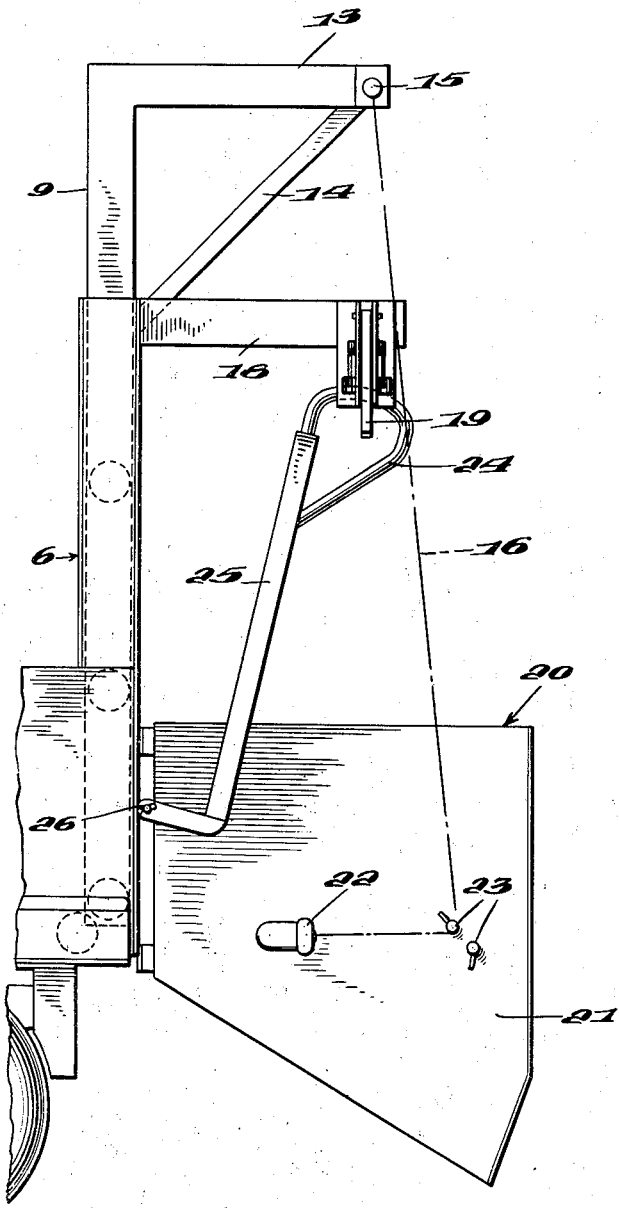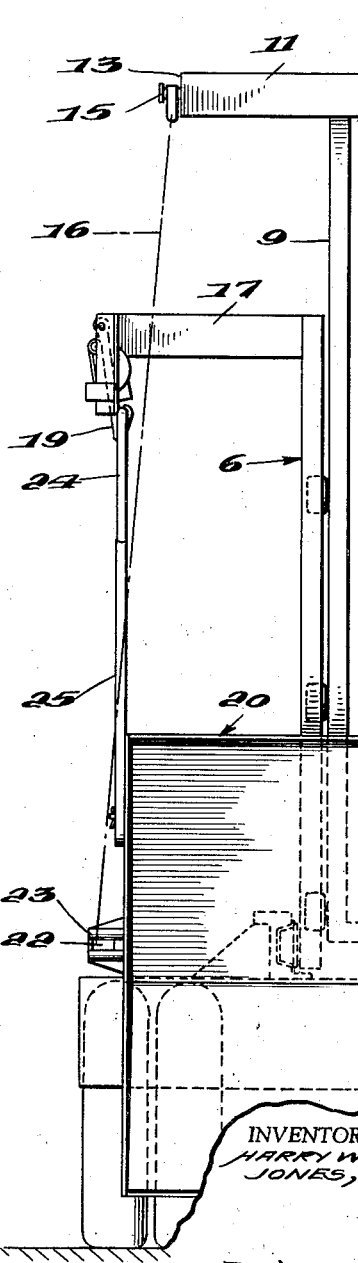

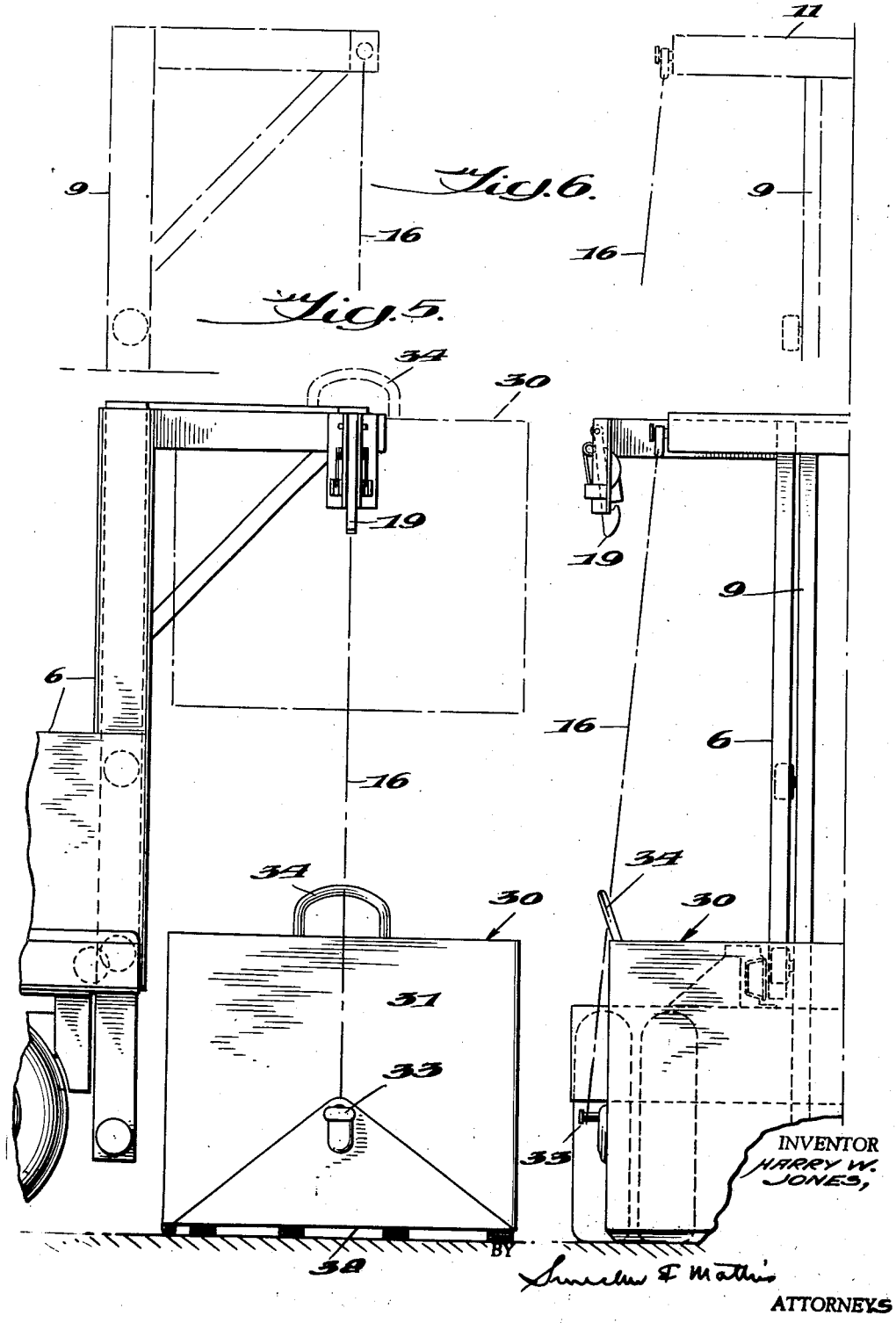

United States Patent Office 3,009,591
Patented Nov. 21, 1961

3,009,591
TRANSPORTING AND DUMPING EQUIPMENT
Harry W. Jones, Knoxville, Tenn., assignor to Dempster Brothers, Inc., Knoxville, Tenn., a corporation of Tennessee
Filed Apr. 11, 1957, Ser. No. 652,254
6 Claims. (Cl. 214—317)

This invention relates to improvements in transporting and dumping equipment of the type adapted to be mounted on or embodied in a motor vehicle for picking up detachable containers, transporting such containers to a remote point and dumping the same.

Heretofore, the hoisting of containers for dumping purposes has been accomplished by sliding the front wall of a container up a skid frame on a skidway or carriage against which it is held during transportation and dumping. Equipment of this type is set forth in Dempster patent, No. 2,437,806, granted March 16, 1948.

In many instances, it is desirable to pick up the container without sliding it up a skid frame or apron and without holding it thereagainst during transportation. However, no practical means has been available heretofore for accomplishing these operations without such skidding action of the container on a skid frame or the like.

One object of this invention is to provide for the picking up, transporting and dumping of a container in suspended relation without sliding the container against a skid frame or the like either during picking up or transportation.

Another object of the invention is to improve the construction of transporting and dumping equipment by providing for the picking up, transporting and dumping of a container in suspended position on a motor vehicle without the container riding against an apron or skidway thereon.

Still another object of the invention is to provide, on a hoisting means for a detachable container, of means spaced out away from the connected portion of the vehicle for engaging the container and causing dumping action thereof in response to a lowering movement of the hoisting means.

A further object of the invention is to improve the construction of a detachable container for handling by a hoisting unit by locating the holding means, such as a bail, on the end walls of the container, intermediate the width thereof, in position for engagement by hooks on the hoisting means for dumping the container automatically.

These objects may be accomplished, according to certain embodiments of the invention, by providing a hoisting unit with outriggers on the elevator cross arm, from which outriggers the lifting means is suspended, such as the conventional chains or cables. Thus, upon raising of the elevator, the container can be lifted bodily in a suspended or free position, separate and apart from the hoisting unit, without the necessity for sliding up a skid frame thereon, nor by being held thereagainst during transportation. Suitable holding means for the body of the container, such as automatic hooks, may be mounted also on outriggers in position for engagement by bails on the end walls of the container. Thus, upon raising of the container, the latter may be held in suspended position during transportation and then moved to engage the bails with the automatic hooks for automatic dumping of the contents from the container.

These embodiments are illustrated in the accompanying drawings, in which:

FIG. 1 is a side elevation of transporting equipment of the type described for supporting a container, the latter being of the tip-over type;

FIG. 2 is a rear elevation thereof;

FIG. 3 is a view similar to FIG. 1, with the container in its dumping position;

FIG. 4 is a partial rear elevation, showing the container in dumping position;

FIG. 5 is a partial side elevation of the hoisting unit, with a container of the drop bottom type shown in full lines in pick-up position;

FIG. 6 is a partial rear elevation thereof;

FIG. 7 is a view similar to FIG. 5, but showing the container in dumping position;

FIG. 8 is a partial rear elevation thereof;

FIG. 9 is a partial top plan view of the hoisting unit;

FIG. 10 is an end elevation of one form of container, showing a modified bail construction; and FIG. 11 is a partial side elevation of said modified form of container.

The invention is illustrated in connection with a hoisting unit of the type set forth in the Dempster patent, No. 2,437,806, granted March 16, 1948, merely as an example of a suitable form of hoisting unit to which the invention may be applied. It is recognized that other types of hoisting units may use the subject of this invention and have the invention applied thereto.

The invention is adapted to be mounted on or embodied in a motor vehicle, such, for example, as a self-propelled vehicle having a chassis, generally designated by the numeral 1, supported on wheels 2. The vehicle chassis is self-propelled under control of an operator, usually located within a cab 3 on the chassis 1.

Also mounted on the chassis 1 is a subframe 4, having guide channels 5 (FIG. 2) extending lengthwise therein. A carriage 6 is mounted on rollers 7 within the guide channels 5 for movement forward and backward relative to the chassis 1. Suitable power means is used for this forward and backward movement of the carriage 6, such as a power operated chain, hydraulic hoist or the like, as described more in detail in the aforesaid Dempster patent, No. 2,437,806.

The carriage 6 has upright guide channels 8 mounted thereon, within which an elevator 9 is mounted by guide rollers 10, which operate in the channels (see FIG. 9). The elevator 9 comprises a rectangular frame suitably braced. Suitable means is provided for raising the elevator 9 with respect to the carriage 6, such as a hydraulic hoist, generally indicated at 12.

At the upper end of the frame of the elevator 9 are outriggers 13 which project as arms an appreciable distance away from the rear end of the hoisting unit in a rearward direction. These outrigger arms 13 should be constructed and suitably braced, as indicated at 14, so as to support the loaded container. To this end, the arms 13 have mounted thereon, at their outer ends, a cross arm 11, provided with pins 15, from which flexible devices 16 are suspended. These flexible devices may be cables, chains or the like, adapted to be connected detachably with opposite ends of a container, as hereinafter described.

The carriage 6 has outwardly extending arms 17 mounted on the upper ends of the guide members 8, from which arms 17 outrigger arms 18 project rearwardly of the vehicle, substantially coextensive with the outrigger arms 13, as shown in FIG. 9. Mounted on the outer free ends of the arms 18 are automatic hooks 19 adapted to be engaged by the container to facilitate dumping, as hereinafter described. Such automatic hooks may be of the type set forth in Dempster patent, No. 2,404,830, which is illustrative of one embodiment thereof.

The hoisting and dumping mechanism is adapted for use with various types and sizes of containers, some of which have been illustrated in the drawings merely as examples of suitable containers that may be used for the purpose. It will be understood, however, that the invention is not restricted to these particular types of containers, nor to the manner of dumping therewith, as exemplified in these embodiments.

In FIG. 1, there is illustrated a container 20 of the tip-over type, having closed opposite ends 21, as well as opposite front and back side walls and bottom, but the top thereof is partially or entirely open or provided with hinged lids. The end walls 21 are provided with lifting pins 22 for connection with the flexible devices 16, by means of which the loaded container is lifted and supported for transportation and dumping. Deflectors 23 are also mounted on each end wall 21 in positions for receiving the chain or other flexible device 16 therebetween, as illustrated in FIG. 1, and to facilitate holding the body of the container during dumping, as illustrated in FIG. 3. A U-shaped or looped deflector may be used for this purpose, if desired, as illustrated at 23' in FIGS. 10 and 11, with the flexible device 16 passing therethrough.

A bail 24 is provided at each end wall 21, projecting above the top thereof in position for engaging the vertically aligned automatic hook 19 thereabove upon raising the container to an appropriate elevation. It will be noted in FIGS. 2 and 4 that the bail 24 is tilted outward away from the ends of the container so as to engage the hook 19, and yet permitting the ends of the container 20 to clear the hook freely in its vertical movement to the position shown in dotted lines in FIG. 1. This will insure of proper engagement with the hook by the bail, without undue interference by the hook with the raising and lowering movements of the container. Flexible devices 16, such as the chains mentioned, should extend around the bail 24, to be deflected thereover.

Each bail 24 is mounted on the upper end of a bar 25 which extends downward along the outer face of each end wall 21, substantially to the bottom, and is shown in FIGS. 1 and 3 as L-shaped, so as to offset the pivot 26 which connects this bar with the bottom portion of the container. The location of the pivot 26 for the respective bars 25 on which the bails are mounted, can be shifted forward or backward relative to the bottom of the container to the most convenient position thereof, according to the size and shape of the container. Moreover, any suitable means, as found desirable, may be used for mounting the bail 24 on each end wall of the container and to provide for dumping thereof.

While the bail bar 25 is shown in FIGS. 1 and 3 as offset or L-shaped, this bail bar may be straight, if desired, as illustrated at 25' in FIGS. 10 and 11, and extending directly from the bail 24' to the pivot 26' on the bottom of the container 20'. In either form as described, the pivot 26 or 26' should be spaced forward of the center of gravity of the container, so as to cause automatic dumping of the container when the bail 24 or 24' is engaged in the automatic hook 19 and the flexible device 16 connected with the adjacent end of the container slackened.

With the tip-over container of the type shown in FIGS. 1 to 4, 10 and 11, this container is adapted to be picked up, with the parts in the positions shown by full lines in FIGS. 1, 2 and 10, wherein the elevator 9 is in its lowered position for engagement of the lifting chains 16 with the lifting pins 22 on the opposite ends of the container 20.

After thus engaging the hoisting chains 16 with the lifting pins 22, the hydraulic cylinder 12 is operated to raise the elevator 9 with respect to the carriage 6. The container may be raised to a suitable position for transportation, such as the position shown in dotted lines in FIG. 1, the elevator then being in the position also shown in dotted lines in FIGS. 1 and 2.

When the hoisting unit reaches its dumping position, the container 20 can be lowered slightly below the hooks 19 and then raised for engagement of the bails 24 with the automatic hooks 19. This is accomplished by lowering the elevator 9 sufficiently for this purpose. The bails will engage the hooks automatically, and the operator in the cab 3 can tell when the hooks are engaged by the clicking action of the shuttles which drop over the bails in the hooks. Then, upon further lowering movement of the elevator 9, the body of the container will be held elevated while tipping over, as illustrated in FIG. 3. The container can bear against the rearward face of the elevator 9, or carriage 6, in this position, or may be suspended free thereof, according to the length of the arms 13 and 18.

As soon as the contents have been discharged from the container and the latter effectively dumped, raising movement of the elevator 9 will lift the container to its upright position again, when it will be suspended by the hoisting chains 16 for transportation to a point of refilling. Merely the raising movement of the container relative to the hooks 19 is sufficient to disengage the bails 24 therefrom, and the container can be set down on the ground, floor or other surface for disengagement of the hoisting chains from the lifting pins 22.

The same hoisting unit can be used for other types of containers. One other example thereof is illustrated in FIGS. 5 to 8 in connection with a drop bottom container.

In this form, the container is indicated at 30, provided with opposite end walls 31 and having a drop bottom door 32 for closing the bottom of the container. Lifting pins are shown at 33, connected with the drop bottom door 32, in position for engagement by the flexible devices, such as chains 16, for lifting the container. Bails are shown at 34 connected with the end walls 31 of the container at the upper edges thereof.

The container is picked up in the positions shown in full lines in FIGS. 5 and 6, by engaging the lifting chains 16 with the lifting pins 33. Then, upon raising the elevator 9, the container can be raised to a suitable elevated position for transportation, such as the position shown in dotted lines in FIGS. 5 and 6.

When the container is transported to a point of dumping, it is necessary merely to engage the bails 34 with the automatic hooks 19, by raising or lowering the container properly to align the bails with the hooks, after which the elevator 9 can be lowered, as illustrated in FIGS. 7 and 8. The body of the container will be suspended by the bails 34 in the hooks 19, while the door 32 will drop open as a result of this lowering movement, to discharge the contents from the container. Then, the elevator can be raised again to close the drop bottom door and to disengage the bails 34 from their automatic hooks, after which the container may be transported to a point of refilling.

The outward deflection of the bails 24, 34, disposes these bails in direct alignment with the throats of the dumping hooks. This assures of proper engagement with the dumping hooks for automatic dumping action and for automatic engagement therewith when desired.

With this construction it is possible to pick up and carry the container in suspended position spaced away from the rear face of the hoisting unit without engagement with a skidway thereon and yet providing for positive and automatic dumping action, as desired.

While the inveniton has been illustrated and described in certain embodiments, it is recognized that other variations and changes may be made therein without departing from the invention as set forth in the claims.

I claim:

1. In transporting and dumping equipment, the combination with a container including a body portion having opposite end walls and bails connected with the container at the end walls thereof, of a hoisting unit including an upright structure, an elevator mounted on the upright structure for raising and lowering movements with respect thereto, arms connected with the upright structure and with the elevator, respectively, and extending outwardly overlying the container, cable means fixed at one end to the arms on the elevator and having detachable connections with the container at the end walls thereof for suspending the container in outwardly spaced relation from the upright structure for transportation, and means carried by the arms on the upright structure for engaging the bails on the container to hold the body of the container for dumping.

2. In transporting and dumping equipment, the combination with a container including a body portion having opposite end walls and bails connected with the container at the end walls thereof, of a hoisting unit including an upright structure, an elevator mounted on the upright structure for raising and lowering movements with respect thereto, arms connected with the upright structure and with the elevator, respectively, and extending outwardly overlying the container, cable means fixed at one end to the arms on the elevator and having detachable connections with the container at the end walls thereof for suspending the container in outwardly spaced relation from the upright structure for transportation, and automatic hooks carried by the arms on the upright structure in positions for detachable engagement with the bails for suspending the body portion of the container upon lowering movement of the elevator for dumping the container.

3. In transporting and dumping equipment, the combination with a container including a body portion having opposite end walls and bails connected with the container at the end walls thereof, of a hoisting unit including an upright structure, an elevator mounted on the upright structure for raising and lowering movements with respect thereto, cable devices each fixed at one end to the elevator and having a detachable connection at the opposite end with end wall portions of the container for suspending the container thereby, and automatic hooks carried by the upright structure in position for detachable engagement with the bails for suspending the body portion of the container upon lowering movement of the elevator for dumping the container, said elevator having arms thereon extending outwardly from the upright structure with the cable devices suspended from the outer end portions of the arms in positions to hold the container spaced away from the upright structure during the raising and lowering movements of the container.

4. A container of the character described, comprising a body portion having opposite end walls, lifting pins connected with the container at the end walls thereof, bails each pivoted to the container adjacent the bottom thereof and having a loop portion extending upwardly to a position over and vertically aligned with the adjacent lifting pin, and guide means on the end walls of the container intermediate the lifting pins and the bails.

5. In transporting and dumping equipment, the combination with a hoisting unit having an upright structure, an elevating device having outrigger means and mounted on the upright structure for translatory vertical raising and lowering movements with respect thereto, an elongated container extending transversely of the hoisting unit and including opposite end walls, holding means connected with the container at the end walls, means connected with the elevating outrigger means and connected with the container at the end walls thereof for suspending the container in outwardly spaced relation from the upright structure during the raising and lowering movements of the container, and means carried by the upright structure and having detachable connections with the holding means on the end walls of the container for supporting the body of the container in said outwardly spaced position for dumping.

6. In transporting equipment, the combination of a container including a body portion having opposite end walls and bails connected with the container and disposed at the upper portions of and approximately midway the width of the end walls thereof, a hoisting unit comprising an upright structure including outrigger portions, an elevator device having outrigger means and slidably mounted on the upright structure for vertical raising and lowering movements with respect thereto, cable devices connected with the elevator outrigger means and having detachable connections with the container at the ends thereof for suspending the container thereby, and automatic hooks carried by said upright outrigger portions in position for detachable engagement with the bails on the end walls for suspending the body portion of the container upon lowering movement of the elevator device for causing dumping of the container, the connections of the cable devices with the outrigger means and with the container being in the same transverse vertical plane with the hooks.

References Cited in the file of this patent

UNITED STATES PATENTS

| | | |
|---|---|---|
| 1,032,271 | Bransfield | July 9, 1912 |
| 2,164,740 | Gerosa et al. | July 4, 1939 |
| 2,289,024 | Lambert | July 7, 1942 |
| 2,437,806 | Dempster | Mar. 16, 1948 |
| 2,696,317 | Toffolon | Dec. 7, 1954 |
| 2,702,142 | Jones | Feb. 15, 1955 |
| 2,751,100 | Dempster et al. | June 19, 1956 |

FOREIGN PATENTS

| | | |
|---|---|---|
| 123,679 | Australia | Feb. 21, 1947 |